CAPROLACTAM POLYMERIZATION
Patrick V. Papero, Jr., Hopewell, and Orvill E. Snider, Petersburg, Va., and Raymond J. Duggan, West Seneca, N.Y., assignors to Allied Chemical Corporation, a corporation of New York
Filed Jan. 28, 1958, Ser. No. 711,566
9 Claims. (Cl. 260—78)

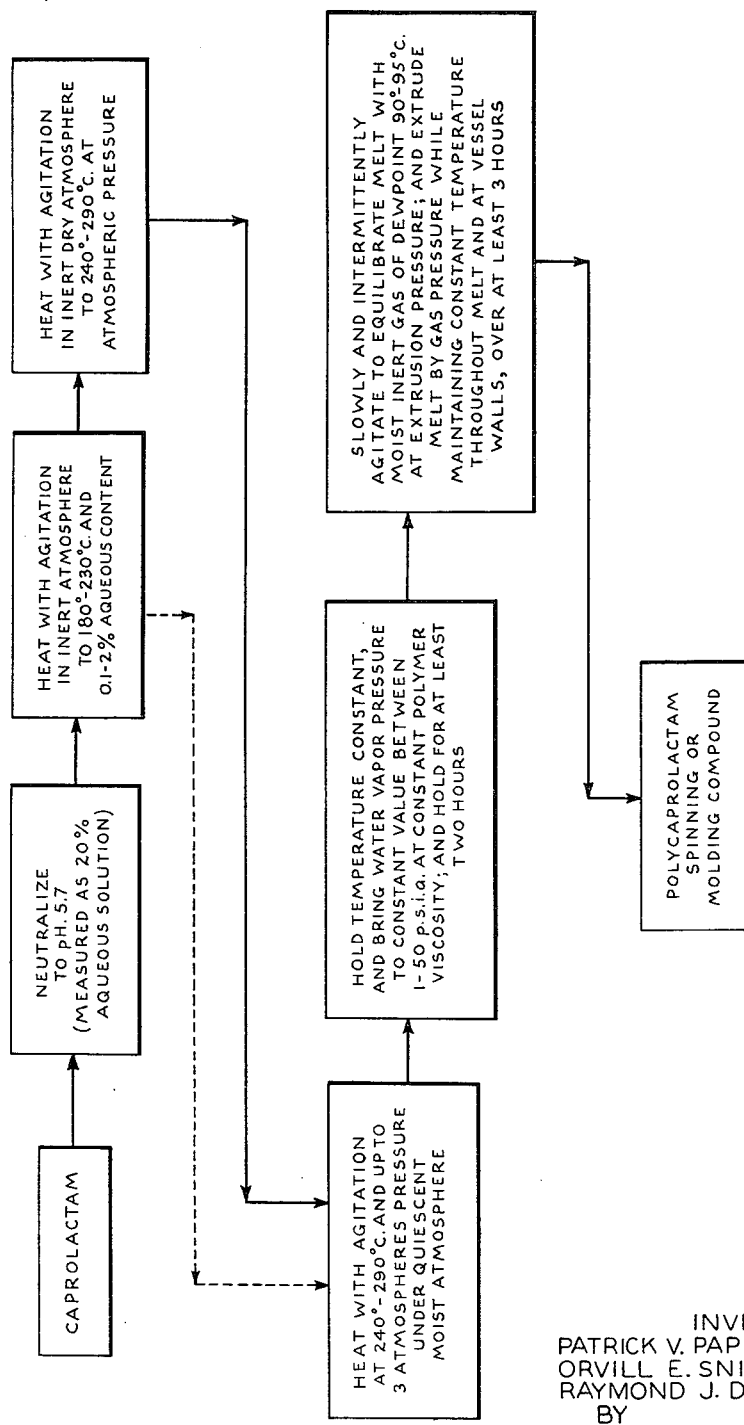

This invention relates to polymerization of caprolactam using water as the catalyst, to form a viscosity-stable product.

In previously proposed operations wherein caprolactam was polymerized with water as the catalyst the viscosity of the resulting polymer increased to very high values upon heating the polymer unless a substance was added functioning as a viscosity stabilizer, such as acetic acid. Use of these viscosity stabilizers influences dyeability adversely in some cases, and influences spinnability adversely in other cases.

We have found that by operating in accordance with the present invention we can polymerize caprolactam in presence of water as sole reactive additive, to polymers of desired viscosities, which viscosities are satisfactorily stable during subsequent heating of the polymers. The resulting polymers, at viscosities suitable for spinning, spin well to yarns having exceptionally high dye absorption and weathering resistance.

Our process starts with epsilon caprolactam brought to a critical pH: namely, lactam which, in water solution of 20% lactam concentration, shows pH of 5.7 within a range of deviation expressed as milliequivalents of neutralizing agent per kilogram of lactam, not more than 2.0 on the acid side and not more than 2.0 on the basic side. Desirably also, said lactam has ash content not above 10 parts per million by weight. The specified pH is necessary to obtain smooth and satisfactorily rapid polymerization by our process, especially in the later polymerization stages after polymer relative viscosity in formic acid, as defined below, of about 20 has been reached. We have found that acidity greater than that specified results in unduly slow reaction, and excessive alkalinity makes control of viscosity by our process unreliable. Superior results in terms of viscosity range ultimately obtainable with good control are realized by use of caprolactam neutral to Tashiro's indicator (i.e., methylene blue-methyl red mixture in ethyl alcohol having acid color (red) at pH 5.6, neutral color (straw) at pH 5.7, and basic color (green) at pH 5.8).

The specified low ash content is desirable especially for spinning polymer, to assure good spinning performance of the polymer and good yarn quality.

Our process further comprises heating with agitation said caprolactam containing water, typically about 0.1%–10% by weight of water up to temperatures in the range from about 180° C. to about 230° C. and simultaneously evaporating any water in excess of about 2% by weight to a concentration in the range between about 0.1% and about 2% of water by weight of the reaction mixture, suitably over a time period of about 3–6 hours. Then the resulting reaction mixture is heated with agitation to a temperature in the range of about 240°–290° C. over a time period of about 5–8 hours. These heating operations are conducted under an atmosphere of inert gas either stationary or flowing such as nitrogen containing not more than 20 parts per million of oxygen, at about atmospheric pressure, preferably at a low positive pressure such as 0.1–2.0 p.s.i.g.

The rate of increase of viscosity (i.e., the polymerization rate) is greater when the atmosphere over the batch is flowing and when the atmosphere is dry. For proper viscosity control, when polymer of relatively low viscosity suitable for spinning is desired, a stream of inert gas containing water can now be blown across the melt, with dewpoint at prevailing pressure of about 90°–95° C. and under low back pressure usually in the range between about 0.1 and about 2.0 p.s.i.g. Alternatively, a quiescent atmosphere of inert gas and evolved water vapor can be maintained over the melt. Then when unwashed, dried samples of the polymer show relative viscosity in formic acid in the range of about 20 to about 40, an atmosphere is provided containing water vapor (moist inert gas or steam) at controlled pressures of water vapor or steam up to about 50 p.s.i. absolute. Constant temperature and pressure conditions are then established and maintained for at least 2 hours at the end of the "On temperature" period, with minimum water vapor pressure of at least about 5 p.s.i. absolute, preferably with about 10–35 p.s.i. absolute water vapor pressure. Preferred temperatures are in the range of 255°–265° C., maintained within ±2° C.

Relative viscosity, V Rel, as used herein, is determined by measuring density, $d$ and efflux time, $t$, of an aqueous 90% formic acid solution of polymer at 25° C. and concentration of 11 grams per 100 ml. of solvent, in accordance with the American Society for Testing Materials Method No. D–789–53T.

$V\ Rel = F \times d \times t/N$ where "F" is a factor for the particular apparatus determined from the average efflux times of aqueous 80% and 90% glycerol; "$d$" and "$t$" are polymer solution density in grams per cubic centimeter, and efflux time in seconds respectively; and "N" is viscosity of 90% formic acid at 25° C. in centipoises. In terms of molecular weights determined by conventional solution viscosity methods, e.g., in meta-cresol, a polymer relative viscosity in formic acid of 20 corresponds to about 10,000 molecular weight and relative viscosity of 50 corresponds to about 18,000 molecular weight.

Spinning polymers usually have relative viscosities, as above defined, in the range of about 25 to about 55; and molding polymers usually have relative viscosities as above defined in the range of about 55 to about 100, more commonly about 55–80 for washed, dried polymers. Unwashed, dried polymer samples usually have relative viscosities 5–20 units lower than for washed, dried polymer. Relative viscosities herein are for washed, dried samples in 90% formic acid solution unless otherwise specified.

It is convenient to measure directly viscosities in the melt during polymerization, e.g. with a falling piston instrument. A calibration curve relating these melt viscosity readings to measured relative viscosities can be employed to obtain relative viscosity values from the melt viscosity readings.

For production of molding polymers, a stream of inert gas is blown across the melt during the reaction period proper at 240°–290° C. temperature until polymer relative viscosity is in the range of about 40 to about 80.

The final adjustment of molding polymer relative viscosity can be made under a moist atmosphere as for spinning polymer by maintaining a moist atmosphere over the melt at water vapor partial pressure of about 1–15 p.s.i. absolute and maintaining temperature constant to within ±2° C., preferably in the range 275°–285° C. Relative viscosity of unwashed, dried polymer samples typically rises by about 10–20 units and then becomes stable during this period, which lasts at least about 2 hours.

If the viscosity of a batch levels at a value lower than desired, the gauge pressure of the moist atmosphere is reduced to say ¼ of its value, and in about ½ hours the viscosity begins rising. The water vapor pressure is then increased slowly as the desired viscosity level is neared, until a stable adjustment of water vapor pressure of about 1–15 p.s.i. absolute at the desired viscosity level is reached. Similarly if the viscosity initially levels off too high, the water vapor pressure is increased say to as much as 30 p.s.i. absolute, to a point at which the viscosity begins to drop; and as the desired viscosity is neared the water vapor pressure is decreased very slowly (to avoid bumping) e.g. over several hours to a value of about 1–15 p.s.i. absolute at which viscosity remains stable at the desired level. When corrections of viscosity have been made as above described, the final stable adjustment is maintained for at least about 2 hours to assure good polymer uniformity.

Use of a moist atmosphere as described, during the part of the heating period in the relative viscosity range from about 40 up, provides superior control and stability in final relative viscosity in the 55–100 range as compared to usual operations omitting this use of moist atmosphere.

When the desired viscosity of the polymer has been obtained and held for at least 2 hours, agitation is stopped and the polymer is allowed to stand at the reaction temperature to release bubbles.

Extrusion of the polymer from the reaction vessel is carried out at essentially constant temperature, in the range of about 240° to about 290° C., maintained constant e.g. to ±2° C. throughout the melt and at the walls of the reaction vessel. Variations of temperature in these operations will affect the uniformity of the polymer product. The extrusion, usually at pressures in the range 25–75 p.s.i.g., is effected using an atmosphere of inert gas containing water, having dewpoint of about 90° to about 95° C. at extrusion pressures. To establish equilibrium with this moist atmosphere, the melt can be agitated slowly and intermittently during the extrusion, e.g. for one minute at 2 r.p.m. every 3–4 minutes; or can be allowed to equilibrate with the atmosphere by standing in contact therewith for at least 2 hours prior to extrusion. This equilibrating step is important: we have found that relative viscosities will continuously rise during the extrusion if the equilibrating step is omitted, e.g. rise from relative viscosity of 47 to relative viscosity of 63 during 8 hours of extrusion from the reactor (unwashed polymer).

The melt viscosity of the polymer is very sensitive to dewpoint of the inert gas over the reaction mixture so that it is often desirable to alternate the dew-point within the limits of the range 90°–95° C., e.g. between 90° and 92° C. or between 93° and 95° C., whereby to maintain the desired viscosity without substantial increase or decrease during the period of extrusion. The extrusion period typically lasts some 3–20 hours.

The accompanying drawing is a diagrammatic flow sheet illustrating the process of our invention. The broken path in the drawing, bypassing the fourth box thereof, indicates the sequence of operations preferably followed in accordance with our invention when spinning polymer is desired; and the solid path including the fourth box indicates an alternative sequence of operations preferably followed in accordance with our invention when molding polymer is desired.

The following examples are illustrative of our process:

EXAMPLE 1

*Production of Spinning Polymer*

To a 60 gallon polymerization kettle jacketed for heating and equipped with an anchor agitator and a horizontal water condenser and previously purged free of air and oxygen, was charged a solution of 90% epsilon-caprolactam and 10% water by weight. This caprolactam had been brought to pH of 5.7 (neutral to Tashiro's indicator, i.e. methylene blue-methyl red in alcohol) within a deviation toward alkaline of not more than 0.05 milliequivalent of neutralizing agent per kilogram of lactam, as measured in aqueous 20% lactam solution. The lactam had ash content not above 10 parts per million by weight. About 400 lb. was used.

An inert gas stream ($N_2$) was injected in the kettle through a flange opening opposite the line leading to the condenser so that a stream of gas was constantly being swept across the surface of the melt. The gas was allowed to pass through the condenser and out the distillate receiver into a water bubbler containing a 4 inch water level. The back pressure in the head of the kettle was thus maintained at 4–5 inches of water.

The following temperature program was then followed:

7 hours, 60–220° C.—Heat up period
2 hours, 220° C.—Reflux period
5½ hours, 220–255° C.
12 hours, 255° C.—"On temperature" period
12 hours, 255° C.—Extrusion phase.

During the heat up period from 60°–220° C., water was continually distilled off. Distillate contained approximately 2–6% lactam. At 220° C. the concentration of water had been reduced to approximately 0.75–1.0% by weight.

At 220° C. the kettle was put on total reflux, that is all material was returned to the kettle. At the end of the reflux period, the kettle was again put on zero reflux.

When the batch reached "On temperature" (255° C.) the inert gas was then saturated through a water bubbler maintained at 92–93° C. before being injected into kettle. The back pressure was increased to 13½ inches of water (0.5 p.s.i.g.). When the melt viscosity reached a predetermined level corresponding to relative viscosity of polymer [1] of about 20–25 in formic acid by ASTM Method D–789–53T above cited, the inert gas was stopped and steam was injected across the melt from a steam generator in which a constant pressure of 1.5 p.s.i.g. was maintained; the back pressure was still maintained at 13½ inches of water i.e. 0.5 p.s.i.g. on the kettle head. When the melt viscosity reached and remained at a level corresponding to polymer [1] relative viscosity in formic acid of about 35–40, the lines to and from the reactor were closed. This period of injecting steam took about one hour. Steam was then injected only as needed to maintain a constant pressure of 0.5 p.s.i.g. on the kettle, until end of "On temperature" period. Then the agitation was stopped and kettle allowed to stand 15 minutes so that any bubbles contained in the melt diffused to the surface.

The back pressure on the steam determines final relative viscosity under conditions as above. For example if a back pressure of 1 p.s.i.g. is maintained using otherwise the above conditions, the final polymer [1] relative viscosity in formic acid is about 30–35 instead of about 35–45 as at back pressures of about 0.5 p.s.i.g.

For extrusion, inert gas was again bubbled through a water saturator held at 92–93° C. until the desired extrusion pressure was obtained in the saturator and kettle, so that the inert gas introduced over the melt had dewpoint of 92–93° C. at extrusion pressure. Extrusion pressures of 50–75 p.s.i.g. were used.

The water-stabilized polymeric material was extruded through a preheated die into a water bath. During extrusion, it is very important that the heating liquid temperature be held at 255–257° C. at full circulation to maintain a wall temperature of 255° C. and a melt temperature of 255° C. Also, the batch was agitated 2 r.p.m. for one minute every 3 minutes for the first 6 hours and 2 r.p.m. for one minute every 4 minutes for the remainder of the extrusion (6 hours).

During the first 4 hours of extrusion, makeup gas was bubbled through a water saturator at 95° C.; during the next 4 hours at 92–93° C.; and for the last 4 hours at 95° C. Alternating the saturation temperatures prevented a buildup or a decrease of the mol percent of ---
[1] Unwashed.

water needed to maintain the desired melt viscosity. The extrusion process was essentially that described in U.S. patent application of Bilanin et al., Ser. No. 545,046, filed Nov. 4, 1955.

The following relative viscosities in formic acid were determined during the extrusion period upon the product of duplicate runs, using aqueous 90% formic acid at 25° C. and concentration of 11 grams per 100 ml. per ASTM Method D–789–53T above cited, upon dried unwashed samples taken each hour during 12-hour extrusion periods. These results demonstrate the excellent uniformity of polymers made by our process and the excellent reproducibility of desired viscosity in our process.

TABLE

| Extrusion Time in Hours | Relative Viscosity in Formic Acid | |
|---|---|---|
| 1 | 37.7 | 37.7 |
| 2 | 38.0 | 38.7 |
| 3 | 37.0 | 38.7 |
| 4 | 37.7 | 38.4 |
| 5 | 39.3 | 38.4 |
| 6 | 38.4 | 38.4 |
| 7 | 39.9 | 38.9 |
| 8 | 39.0 | 38.1 |
| 9 | 38.6 | 37.3 |
| 10 | [1] 42.1 | 37.4 |
| 11 | 38.1 | 37.8 |
| 12 | [1] 42.3 | 40.6 |
| 13 | 38.9 | |

[1] Rechecks were not run on these dubious results.

Increased dyeability was obtained over polymers made with organic acid viscosity stabilizers such as acetic or adipic acid, as shown by the following comparative tests.

Dye absorption was determined by dissolving 0.06 gram (6% by weight on the polymer) of Alizarine Sapphire BLN, Color Index No. 63,010 (an acid type dyestuff), in 30 cc. of water; adding one gram of polymer; adding 0.04 gram of formic acid and heating 3 hours at 95°–97° C.; then adding 0.01 gram of sulfuric acid and boiling for one hour. Water lost by evaporation was replaced from time to time. The dye absorbed was determined by difference from a spectrophotometric measurement of the dye remaining in the exhaust liquor.

The dye absorption thus determined for polymers produced in accordance with the procedure of the above example ranged from 3.3 to 3.5% whereas dye absorption of polymers of like relative viscosity obtained similarly, but in presence of various previously recommended organic acids including acetic acid and adipic acid were all in the range 1.0–2.3%.

The uniformity of average molecular weight of the polymer of the above example, as shown by uniformity of relative viscosity, conduces to even, uniform dyeability of yarns spun therefrom.

The polymer of the example spins very well by contrast to polymers, made with certain previously recommended basic organic catalysts and viscosity stabilizers, which polymers tend to drip from the spinneret holes rather than forming good unbroken filaments. The viscosity of our polymers remains satisfactorily stable in the melt during spinning operations.

Yarns spun from polymer prepared essentially as in Example 1 above showed clearly superior weathering resistance over comparable commercially available polycaprolactam yarns, both bright yarns and yarns dulled with 0.3% titanium dioxide.

Polyhexamethylene adipamide nylon, 70 denier yarns, bright and dull, were taken as controls; and comparisons with 70 denier polycaprolactam yarns were made in simultaneous outdoor weathering tests. The yarns were tested for ultimate tensile strength at intervals, and were rated according to their percent loss of ultimate tensile strength when the control had 70% loss. Thus the best yarns have the lowest ratings. Results are tabulated below.

TABLE

Ratings

Yarns in accordance with this invention:
  A _____ 33 (bright).
  B _____ 42 (bright).
  C _____ 45 (dull).
Commercially available polycaprolactam yarns:
  A _____ 60 (bright).
  B _____ 61 (dull).
Experimental polycaprolactam yarn made with mineral acid catalyst _____ 60 (dull).
Control yarns (66 nylon) _____ 70 (bright and dull).

EXAMPLE 2

*Production of Molding Grade Polymer*

To a 60 gallon polymerization kettle jacketed for heating and equipped with an anchor agitator and horizontal water condenser, previously purged free of air and oxygen, was charged a solution of 90% epsilon-caprolactam of the quality stated in Example 1 and 10% water by weight. A stream of nitrogen containing not more than 20 parts per million of oxygen was injected into the kettle through a flange opening opposite the line leading to the condenser, so that a stream of gas was constantly being swept across the surface of the melt. The gas was allowed to pass through the condenser and out the distillate receiver into a water bubbler containing a 7 inch water level. The back pressure in the head of the kettle was maintained at 7–8 inches of water, i.e. about 0.3 p.s.i.g.

The following temperature program was then followed:

7 hours, 50–195° C.—Heat up period
1 hour, 195° C.—Reflux period
5½ hours, 195–255° C.
12 hours, 255° C.—"On temperature" period
12 hours, 255° C.—Extrusion phase During the heat up period from 50–195° C. water was continuously distilled off. Distillate contained approximately 2–6% lactam. At 195° C. the concentration of water had been reduced to approximately 1.0–1.5%. At 195° C. the kettle was put on total reflux, that is all material was returned to the kettle. At the end of the reflux period the kettle was again put on zero reflux.

After the batch reached "On temperature" at 255° C., the flow of nitrogen, the temperature, and the back pressure were held constant until polymer [1] relative viscosity reached about 50, at which time the agitation was stopped and the batch was allowed to settle for 15–30 minutes so that any bubbles contained diffused to the surface.

Effect of varying back pressures and "On temperature" periods can be seen in the following runs. It will be noted that at 0.5–1.0 p.s.i.g. back pressures substantially constant viscosity is reached in about 9 hours of heating at 255° C.

[1] Unwashed.

TABLE

| Run No. | Back Pressure | Reduced Viscosity of Samples in Meta-Cresol Hours on Temperature 255° C. | | | | Approximate Relative Viscosity in Formic Acid of 12 Hour Sample [1] |
|---|---|---|---|---|---|---|
| | | 3 | 6 | 9 | 12 | |
| 199 | 1″ H₂O | 1.39 | 1.54 | 1.74 | 1.84 | 55 |
| 286 | 1″ H₂O | 1.29 | 1.49 | 1.61 | 1.85 | |
| 179 | 13″ H₂O | 1.37 | 1.50 | 1.60 | 1.58 | 45 |
| 183 | 13″ H₂O | 1.26 | 1.38 | 1.54 | 1.58 | |
| 172 | 27″ H₂O | 1.40 | 1.48 | 1.49 | 1.56 | 40 |
| 188 | 27″ H₂O | 1.26 | 1.36 | 1.51 | 1.50 | |

[1] Unwashed.

The above reduced viscosities are at concentration of 0.5 weight percent in meta-cresol and at 25° C. temperature using unwashed, dried polymer.

For extrusion, inert gas containing water was applied to the kettle until the desired pressure was obtained. Extrusion pressures of 30–40 p.s.i.g. were used. The gas over the melt had dewpoint, at extrusion pressure, of 95° C.

The material was extruded through a preheated die into a water bath.

During extrusion it is very important that the heating liquid temperature be held constant so that a constant vapor pressure is maintained above the melt surface. Fluctuations in temperature result in varied vapor pressures which directly affect viscosity.

Other variables which can affect the melt viscosity are gas dewpoints; very high dewpoints may include too much water resulting in reducing degree of polymerization below the desired level.

Reflux period has been eliminated with comparable results to those of this Example 2.

The polymer of this Example 2 is useful for injection molding and for extrusion including extrusion of monofils.

Molding polymers produced in accordance with this invention show good viscosity stability, so that they can be repeatedly molded without substantially changing their characteristics. This is important for reuse of scrap in molding operations. For example, polymers produced by the present process, having relative viscosities in formic acid in the range of about 65 to about 75 (washed and dried) were repeatedly remolded. They showed only gradual decrease of viscosity upon repeated molding, for a drop of only about 8 viscosity units each, after the fifth molding.

The polymers produced in accordance with this invention are essentially neutral, imparting pH of about 6.8 to distilled water upon boiling 5 grams of 20 mesh polymer in 50 ml. of distilled water, protected from atmosphere carbon dioxide.

EXAMPLE 3

Production of Polymer for Textile Yarn Spinning

In this example the lactam charged was 99.6% epsilon-caprolactam, neutral to Tashiro's indicator as in Example 1, and 0.4% water by weight. The procedure and apparatus were generally as in Example 1, with exceptions as noted below.

Inert gas (nitrogen containing not more than about 5 p.p.m. of oxygen) was used to purge the reaction vessel before and after charging, and was maintained above the reaction mixture as a quiescent atmosphere at about 1.0–1.5 p.s.i.g. The vapor space above the charge was not more than about one-fourth the volume of the charge.

The heating program followed was:

4 hours, 115° C. up to 210° C. } Heat up period
6½ hours, 210° C. up to 255° C.
4 hours, 255°–265° C. } "On temperature" period
12 hours, 260°–262° C.
5 hours, about 260° C.—Extrusion phase The viscosity of the melt began to rise after about 2½ hours of heating "On temperature" at 255°–265° C. It reached a value of 15, corresponding to formic acid relative viscosity of about 20 for samples of unwashed, dried polymer (i.e. about 30 for washed, dried polymer) in another 1½ hours. At this time (4 hours "On temperature"), the kettle outlet was closed, and the pressure within the kettle began to rise as a result of evolution of vapors of volatile materials, principally water, from the reaction mixture.

The internal pressure reached about 15 p.s.i.g. in about 1½ hours and was held around 10–15 p.s.i.g. (i.e. about 25–30 p.s.i. absolute water vapor pressure) while the viscosity of the melt continued to rise. The melt viscosity reached the desired level of 42, corresponding to about 35 formic acid relative viscosity of unwashed, dried polymer, after a total "On temperature" period of about 9 hours.

During the period including 10, 11, 12 and 13 hours "On temperature," a viscosity drop of about 8 units was noted; accordingly the internal pressure in the polymerization kettle was relieved gradually to about 5 p.s.i.g. (about 20 p.s.i. absolute water vapor pressure). The desired viscosity was thus restored, the final pressure being about 6 p.s.i.g. The viscosity remaining stable with pressure held at about 6 p.s.i.g. thereafter for 2 hours, the batch was extruded as in Example 1 under inert gas at 50 p.s.i.g. and dewpoint 90°–92° C. at extrusion pressure.

The relative formic acid solution viscosity of samples of the unwashed, dried polymer taken hourly during the 5 hour extrusion period varied from 34.2 to 35.2. When mixed with 7 like batches and washed with hot water and dried the final polymer showed relative formic acid solution viscosity of 45.6 and showed light transmission figure of 92% indicating excellent freedom from color. It was very suitable for spinning textile yarns.

EXAMPLE 4

Production of Molding Grade Polymer

It was carried out generally in the manner of Example 2 with exceptions as noted below.

The lactam charged contained less than 1% of water and was neutral to Tashiro's indicator. It filled the reaction kettle at least four-fifths full.

The heating program was as follows:

4 hours, 110° C. up to 200° C. } Heat up period
6 hours, 200° C. up to 250° C.
2 hours, 250° C. up to 268° C.
7 hours, 268° C. up to 270° C.
3 hours, 270° C. up to 275° C. } "On temperature" period
5½ hours, 275° C. up to 279° C.
5 hours, at 279°–281° C.
12 hours at about 280° C.—Extrusion phase When the batch reached 250° C., a stream of inert gas was started across the melt surface under about 0.1–0.2 p.s.i.g. back pressure at about 100 cu. ft./hour. The viscosity of the melt began to rise at temperature about 268° C., after about 3½ hours of heating "On temperature" above 250° C. The rate of flow of sweep gas was reduced to about 30 cu. ft./hour at this point and the flow was continued at constant temperature of 268° C. for 3 hours, and then the reaction vessel was closed off and steam was introduced to a pressure of about 4 p.s.i.g. The melt viscosity at this time was 47, corresponding to a relative formic acid viscosity of unwashed, dried polymer of about 40 (i.e. about 55 relative formic acid viscosity of hot water washed, dried polymer).

The melt viscosity rose in 1 hour by 14 units; accordingly the steam pressure was gradually increased over about 3 hours until a pressure of about 16–17 p.s.i.g. was reached over the melt. The melt viscosity had then been level for about 1 hour at 80. Thereafter the pressure was gradually decreased during 3 hours to about 7–8 p.s.i.g. over the melt (corresponding to about 11–12 p.s.i. absolute water vapor pressure, on the basis that at the maximum pressure reached of 16–17 p.s.i.g. the pressure over the melt was about one-half due to inert gas orginally present and about one-half due to steam subsequently admitted). Pressure and temperature were held constant, and melt viscosity remained substantially level in the range 78–80 for the next 8 hours, after which the polymer was extruded over a 12 hour period at about 280° C. essentially as in Example 2. The relative 90% formic acid viscosity of samples of unwashed, dried polymer taken every 2 hours during extrusion was about 48.

The final polymer product was mixed with 7 like batches and was washed with hot water and dried. The resulting washed, dried polymer had a relative 90% formic acid viscosity of 67.4 and had excellent freedom from color as shown by light transmission value of 94.3%. It was well suited for molding use such as injection molding.

Thus the critical features of our process, allowing polymerization of epsilon-caprolactam in presence of water as sole additive to uniform polymers of desired viscosity, are in summary:

(1) Using caprolactam monomer producing critical range of pH in aqueous 20% solution, namely pH 5.7±about 0.1 pH unit.

(2) Using inert gas as atmosphere over the polymerization melt and temperatures reaching 240°–290° C.; and providing, at latest just before the extrusion phase of the 240°–290° C. heating period, an atmosphere of gas having higher water vapor pressure than does said first mentioned gas atmosphere, said higher water vapor pressure being ultimately levelled off in the range between about 1 p.s.i. and about 50 p.s.i. absolute and being maintained essentially level for at least about 2 hours with temperature likewise maintained essentially constant during at least these last 2 hours before extrusion.

(3) Using during the extrusion phase an inert gas atmosphere containing water vapor and having dewpoint in the range between about 90° C. and about 95° C. at extrusion pressure (i.e. having water vapor pressure of about 10–13 p.s.i. absolute), said atmosphere being equilibrated with the melt undergoing extrusion and said melt being maintained at essentially constant temperature throughout the melt and at the walls of the reaction vessel during the extrusion phase.

We claim:

1. Process for polymerizing epsilon-caprolactam to a polymer of relative viscosity in formic acid of at least about 25, measured upon washed, dried polymer in aqueous 90% formic acid at 25° C. and concentration of 11 grams per 100 cc. of solvent, in which process water is the sole reactive additive and which process further comprises bringing the caprolactam starting material to pH 5.7 as measured in water solution of 20% lactam concentration, within a range of deviation not more than 2.0 milliequivalents of neutralizing agent per kilogram of lactam; heating a solution of said lactam and water with agitation under an atmosphere of inert gas at about atmospheric pressure to temperature in the range between about 180° C. and about 230° C., and simultaneously establishing a concentration of water in the range between about 0.1% and about 2.0% of water by weight of the reaction mixture; then heating the resulting reaction mixture with agitation to polymerizing temperatures in the range of about 240° C. to about 290° C. under an atmosphere of inert gas at about atmospheric pressure; then continuing the heating in the range 240°–290° C. with agitation to a washed, dried polymer relative viscosity in 90% formic acid of at least 25; at latest just before the extrusion phase of the period of heating at 240°–290° C., providing a gas atmosphere having higher water vapor pressures than said first mentioned atmosphere, said water vapor pressures ultimately reaching a level value which is maintained for at least 2 hours, in the range between about 1 and about 50 pounds per square inch absolute with temperature likewise maintained constant within about ±2° C. during at least these last 2 hours before extrusion; and extruding under gas pressure over a time period of at least about 3 hours polymer at the desired final viscosity from the resulting polymer melt, said polymer melt being equilibrated with moist inert gas with dewpoint, at extrusion pressure, of about 90° C. to about 95° C. and said melt being maintained at temperature constant within about ±2° C. throughout the melt and at the walls of the reaction vessel.

2. Process as defined in claim 1 wherein during a first part of the heating period at 240°–290° C., to washed, dried polymer relative viscosity in the range between about 20 and about 40, the gas atmosphere is a quiescent dry inert gas; and in the remaining part of this heating period, to washed, dried polymer relative viscosity in the range between about 25 and about 55, a quiescent moist atmosphere is maintained over the polymer melt at controlled water vapor pressure in the range between about 10 and about 35 pounds per square inch absolute; and after the desired polymer relative viscosity is reached, the said moist atmosphere is replaced with moist inert gas of dewpoint 90°–95° C. at extrusion pressure and while the polymer is extruded the melt is agitated slowly and intermittently to equilibrate the melt with the moist atmosphere above it.

3. Process as defined in claim 2 wherein the polymerization temperature employed and the extrusion temperature employed is in the range 255°–265° C. and is maintained constant for at least the last 2 hours of polymerization and throughout the extrusion within about ±2° C.

4. Process as defined in claim 1 wherein the polymer melt is heated under a stream of inert gas at temperatures in the range from about 240° C. to about 290° C. and then is heated for at least about 2 hours under essentially constant water vapor pressure in the range between about 1 and about 15 p.s.i. absolute and with temperature held constant within ±2° C. in the range 275°–285° C.; and when the viscosity of the polymer becomes stable while said constant water vapor pressure and said constant temperature are maintained, with relative viscosity of the washed, dried polymer in 90% formic acid being in the range of about 55 to about 80, the polymer is extruded from the resulting melt.

5. Process for polymerizing epsilon-caprolactam to a polymer of relative viscosity in formic acid of at least about 25, measured upon washed, dried polymer in aqueous 90% formic acid at 25° C. and concentration of 11 grams per 100 cc. of solvent, in which process water is the sole reactive additive and which process further comprises bringing the caprolactam starting material to pH 5.7 as measured in water solution of 20% lactam concentration, within a range of deviation not more than 2.0 milliequivalents of neutralizing agent per kilogram of lactam; heating a solution of said lactam and water under an atmosphere of inert gas to temperature in the range between about 180° C. and about 230° C., and simultaneously establishing a concentration of water in the range between about 0.1% and about 2.0% of water by weight of the reaction mixture; then heating the resulting reaction mixture with agitation to polymerizing temperatures in the range of about 240° C. to about 290° C. under an atmosphere of inert gas at about atmospheric pressure; then continuing the heating in the range 240°–290° C. with agitation to a washed, dried polymer relative viscosity in 90% formic acid of at least 25; at latest just before the extrusion phase of the period of heating at 240°–290° C., providing a gas atmosphere having higher water vapor pressures than the atmosphere used during the just mentioned 240°–290° C. heating period, said water vapor pressures ultimately reaching a level value in the range between about 1 and about 50 pounds per square inch absolute with temperature maintained essentially constant; and extruding the resulting polymer melt under an atmosphere of inert gas containing water vapor with which atmosphere the polymer melt is equilibrated, the partial pressure of water vapor in said atmosphere being maintained substantially constant by saturating the inert gas with water vapor at a lower temperature than the temperature of the polymer melt but at the same pressure as maintained on said atmosphere over the polymer melt.

6. Process as defined in claim 5 wherein the inert gas, used to form the atmosphere over the polymer melt in the extrusion step, is saturated with water vapor at temperatures in the range between about 90° C. and about 95° C.; and the extrusion is effected by applying pressures in the range 25–75 p.s.i.g. to said atmosphere, the extrusion being over a time period of at least 3 hours and with the melt being maintained at essentially constant temperature throughout the melt and at the walls of the reaction vessel during the extrusion.

7. In a process of extruding polycaprolactam wherein a melt of the polymer is exposed to water vapor for a time sufficient to establish equilibrium between the melt and the water vapor before the melt is extruded, the improved method of controlling the equilibrium between polymerization and depolymerization which comprises maintaining partial pressure of the water vapor in the atmosphere over the melt substantially constant throughout the extrusion operations by maintaining as atmosphere over the melt an inert gas saturated with water at a lower temperature than the temperature of the melt but at the same pressure as that over the melt, whereby the ratio of the partial pressures of the water vapor and the said inert gas are maintained constant at the temperature of the melt, and producing from said extrusion process polycaprolactam having improved physical properties.

8. Process of claim 7 wherein said inert gas is nitrogen.

9. Process of claim 8 wherein the nitrogen is saturated with steam by continually contacting the nitrogen with moisture at the desired predetermined temperature.

References Cited in the file of this patent

UNITED STATES PATENTS

| | | |
|---|---|---|
| 2,130,947 | Carothers | Sept. 20, 1938 |
| 2,241,322 | Hanford | May 6, 1941 |
| 2,571,975 | Waltz | Oct. 16, 1951 |
| 2,735,840 | Lynch | Feb. 21, 1956 |
| 2,943,350 | Rodenacker | July 5, 1960 |

OTHER REFERENCES

Hanford et al.: J. Poly. Sci., vol. 3, pp. 167–172 (1948).

Ser. No. 370,142, Schlack (A.P.C.), published June 22, 1943.